Inventor
Merrell R. Fenske
By Hugo G. Kemman
Attorney

July 23, 1940. M. R. FENSKE 2,208,573
PROCESS AND APPARATUS FOR FRACTIONAL DISTILLATION
Filed Aug. 7, 1937 6 Sheets-Sheet 5

Fig. 11.

Inventor.
Merrell R Fenske
by Hugo G Kemman
Attorney

July 23, 1940.   M. R. FENSKE   2,208,573
PROCESS AND APPARATUS FOR FRACTIONAL DISTILLATION
Filed Aug. 7, 1937   6 Sheets-Sheet 6

Fig. 12.

Inventor.
Merrell R. Fenske
by Hugo G. Kemman
Attorney

Patented July 23, 1940

2,208,573

UNITED STATES PATENT OFFICE 2,208,573

PROCESS AND APPARATUS FOR FRACTIONAL DISTILLATION

Merrell R. Fenske, State College, Pa., assignor to The Pennsylvania Research Corporation, State College, Pa., a corporation of Pennsylvania Application August 7, 1937, Serial No. 157,925

12 Claims. (Cl. 202—40)

This invention pertains to a method and apparatus for fractional distillation wherein high efficiencies are obtained by effectively contacting the ascending vapors and descending reflux without serious channeling.

This is accomplished generally speaking by conducting the reflux down through the zone of contact in film form and in separate streams over a plurality of separately enclosed attenuated packing members.

The packing members being separately enclosed, for instance, by tubes having relatively small cross sections of any desired geometrical shape, the ascending vapors are brought into efficient contact with the descending reflux in a plurality of separate countercurrently flowing pairs of streams, or in other words in a plurality of separate fractionating units. The ascending vapors and/or descending reflux may be metered into each unit in a manner so that the rectified vapors produced by any one unit will be of substantially the same composition as the rectified vapors produced by any other unit.

In any case at least a very large part of the descending reflux is maintained in film form by virtue of its spreading out over the packing members.

While the capacity of the tower may be increased somewhat by increasing the cross sections of the packing members, to avoid serious channeling due to too large a cross section, the capacity preferably will be increased and decreased by increasing and decreasing the number of packing members, the overall diameter of the tower being adjusted to conform thereto.

The individual separately enclosed attenuated packing members may be of any desired construction. For instance each packing member may be made up of a large number of small units, which may be disconnected, such as Raschig rings, or similar packing. Small wire forms, such as single turn spirals, polyturn spirals, H shapes, S shapes, wire forms in the shape of a double cross such as # shapes, open rings, ordinary carding teeth, bent carding teeth, and similar forms all having dimensions comparable to carding teeth used in the textile industry, are found to be extraordinarily efficient. However, any other packing such as jack chain may be used to fill the tubes. In addition, different packing material may be used at different positions in the tower. For example, coarser, less efficient packing may be used near the bottom or feed point, and finer, more efficient packings at other positions in the tower.

Further features of the invention reside in the construction, arrangement and combination of parts, and in the steps, combinations of steps, and sequences of steps, all of which, together with other features, will become more apparent to persons skilled in the art as the specification proceeds and upon reference to the drawings in which:

Figure 2 is a section on line 2—2 of Figure 1a;
Figure 3 is a section on line 3—3 of Figure 1a.

For convenience in description tower 10 of Figures 1a to 6 will be referred to as being made up of sections A, B, C and D.

Figure 1A:
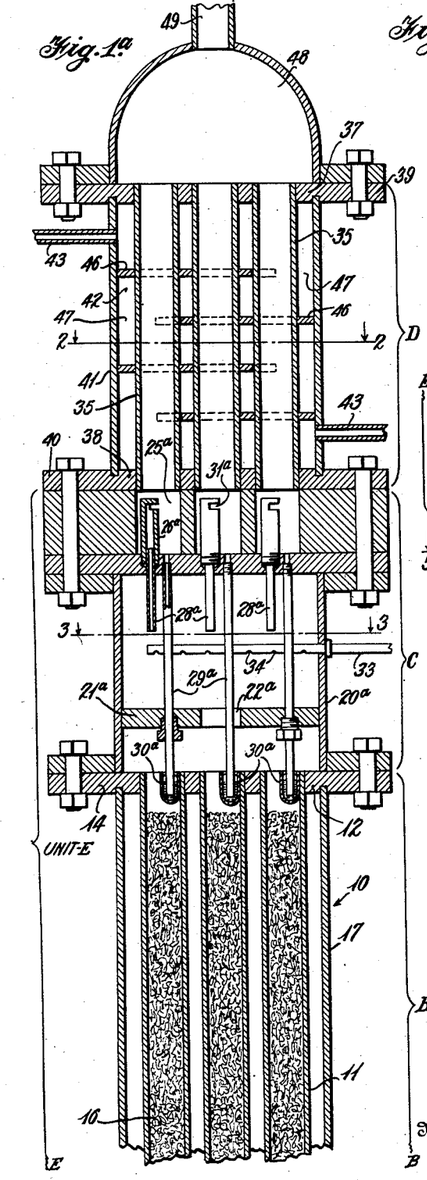
Figures 1a and 1b comprise a sectional elevation (shown broken) illustrating one form of the invention.
Figure 1B:
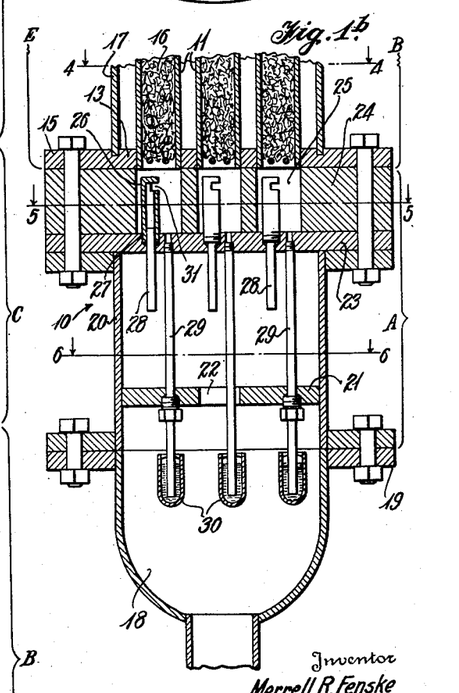
Figure 2:
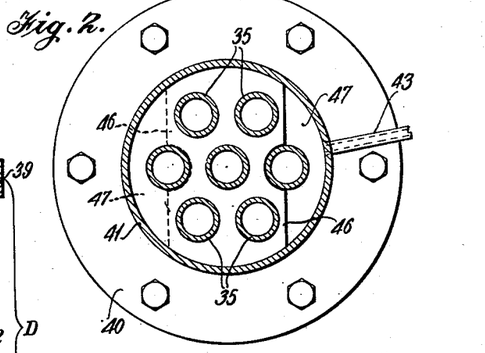
Figure 3:
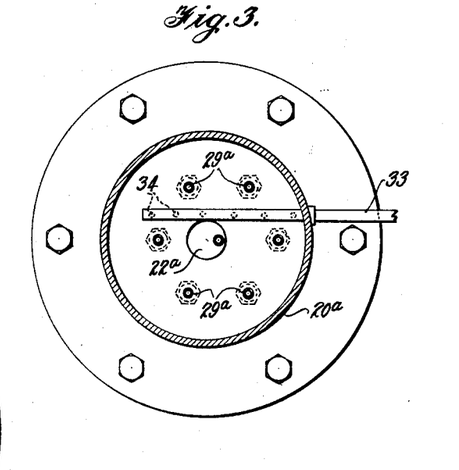
Figure 4:
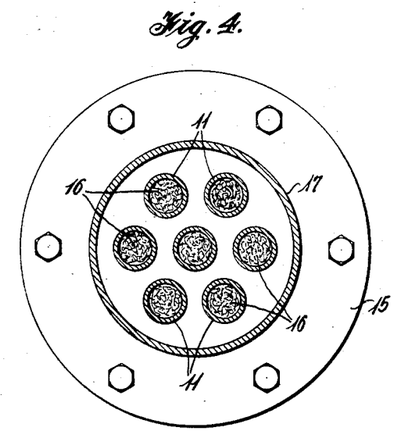
Figure 4 is a section on line 4—4 of Figure 1b.
Figure 5:
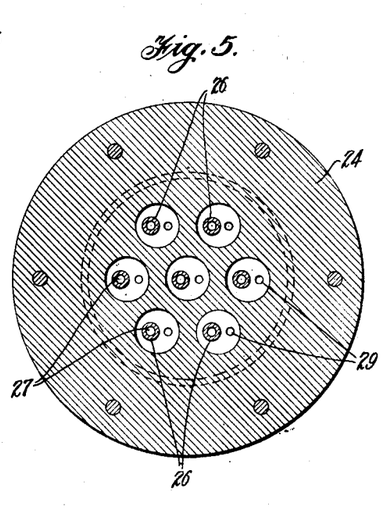
Figure 5 is a section on line 5—5 of Figure 1b.
Figure 6:
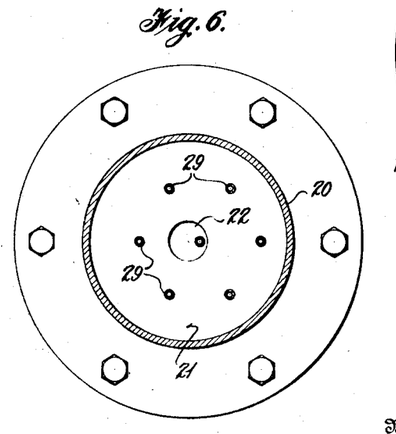
Figure 6 is a section on line 6—6 of Figure 1b.

Section B, a part of which is shown in Figure 1a and another part in Figure 1b, comprises a plurality of tubular members 11, having their ends mounted in tube sheets 12 and 13. Tube sheets 12 and 13 are illustrated for convenience as being integral with flanges 14 and 15 respectively. Tubes 11 may have a cross section of any desired geometrical configuration and up to certain limits of any desired cross sectional area. The cross section of tubes 11 is preferably limited to an area sufficiently small to prevent serious channeling after the contacting means, for instance, packing 16, has been arranged therein.

The limiting cross sectional area for tubes 11 will be not only a function of the type of packing employed since the small wire forms referred to above will be as a rule permit the use of a larger cross section, without an inordinate falling off of efficiency, than Raschig rings or jack chain, but also of the degree of uniformity of distribution of the packing in the tube. For this reason a definite limit in cross sectional area cannot be given, but is easy of determination, for instance, by testing the efficiency of a single tube by any approved method such as set forth in Industrial and Engineering Chemistry, November 1934, page 1169. It may be stated as a general rule that one should proceed with caution after exceeding a cross sectional area of the order of twelve square inches. For example, Number 19 single link iron jack chain when tested under total reflux with carbon tetrachloride-benzene mixtures at atmospheric pressure shows for a 2 inch diameter column an H. E. T. P. of five to six inches, for a 3 inch diameter column an H. E. T. P. of about eleven inches, and for a 5.75 inch diameter column an H. E. T. P. of about eighteen inches.

Again, one-half inch Raschig rings in a 2 inch diameter column shows an H. E. T. P. of about five to six inches, for a 4 inch diameter column an H. E. T. P. of about six to seven inches and for an 8 inch diameter column an H. E. T. P. of about twelve to thirteen inches when tested with either normal heptane and methylcyclohexane mixtures or methylcyclohexane-toluene mixtures under total reflux at atmospheric pressure.

The designation H. E. T. P. means the height of packing equivalent to one theoretical plate.

Again in testing at atmospheric pressure and under total reflux using $\tfrac{3}{32}$ inch diameter single turn helices such as described in my Patent No. 2,037,317, April 14, 1936 with normal heptane and methylcyclohexane mixtures, it was found that in a column 0.79 inch inside diameter and packed for 111 inches that the H. E. T. P. was about 1.1 inches.

Under comparable conditions in a 2 inch inside diameter column of the same height of packing, these same helices gave an H. E. T. P. of about 2.2 inches.

The 111 inch length of 2 inch diameter column without any packing whatever gave an H. E. T. P. of from 25 to 30 inches.

With various types of wire helix packing it is also possible to obtain a low pressure drop per theoretical plate even under conditions of good throughput. For example, it is perfectly possible to obtain pressure drops of the order of 0.3 to 1.0 mm. of mercury per theoretical plate, for superficial vapor velocities of the order of one foot per second at atmospheric pressure. Thus applications to vacuum fractionation are obvious.

Tubes 11 are illustrated as being surrounded by a shell 17 which is secured to flanges 14 and 15. Shell 17 may be lagged to make the contacting section of the tower adiabatic. However, the lagging may be applied directly to each tube or may enclose all of the tubes, if desired. Any other means may be substituted. For example, the tubes may be jacketed with vapors used in the tower provided the vapors are at temperatures suitable for the tubes.

Section B is a phase contacting section and functions as such.

Below section B is section A.

Among the functions of section A is that of metering vapors into the tubes 11. These vapors, flowing from a still or other source, enter the tower through a chamber 18 which is shown attached to the lower end of section A as illustrated at 19.

The lower portion of section A is illustrated as comprising a shell 20 in which is disposed a vapor mixing plate 21, having an opening 22 at its center.

Transverse plate 23 contacts the top of shell 20. Immediately above plate 23 is member 24 which, in turn, contacts tube sheet 13.

Member 24 has a plurality of vertically arranged chambers 25 of the same number as the tubes 11. Each chamber 25 communicates with a tube 11 at its lower end.

Within each chamber 25 is a hollow plug 26 which is shown threaded at 27 into plate 23. The lower end of plug 26 holds the upper end of a metering tube 28 which projects down into shell 20.

A reflux drain tube 29, shown with its upper end secured in plate 23, extends downwardly from each chamber 25 and through plate 21 into chamber 18. Each tube 29 is provided with a cup 30 about its lower end for purposes which will hereinafter appear.

Section C, which is disposed above section B, is illustrated as being of the same construction as section A except that it is provided with a vapor draw-off tube 33. Tube 33 extends through shell 20a at a point above vapor mixing plate 21a and has a plurality of spaced inlets 34.

Section D is disposed above section C.

Section D comprises a plurality of individual condensers. These condensers correspond in number to the tubes 11. As illustrated, each condenser comprises a tubular member 35 which communicates at its lower end with a separate chamber 25a of section C.

Tubular members 35 are illustrated as being mounted in tube sheets 37 and 38. Tube sheets 37 and 38 are illustrated for convenience as being integral with flanges 39 and 40 respectively. A shell 41 surrounds tubes 35 and contacts flanges 39 and 40 to form a chamber 42 for heat exchange purposes. Shell 41 is illustrated as having openings 43 for the circulation of a cooling fluid through the chamber 42. For effective distribution of the cooling fluid, baffles 46, each forming an opening 47 with shell 41, are shown arranged in spaced relationship in chamber 42 with the openings 47 staggered so as to cause the cooling fluid to flow back and forth through the chamber 42 as it passes therethrough.

The upper ends of tubes 35 open into chamber 48 which has an outlet 49 for the removal of non-condensable gases.

Assuming that the individual fractionating units have been substantially equally matched the operation of the tower is as follows.

Vapors enter chamber 18 from a still or other source and are thoroughly mixed as they pass through opening 22 in plate 21.

These vapors are metered into hollow plugs 26 by metering tubes 28 which, under the assumed conditions, are of equal capacity, although adjustments may be made, for instance, by making metering tubes 28 interchangeable, to compensate for possible inequalities in the fractionating units 11 as will appear hereinafter.

Plugs 26 are provided with openings 31 in their side faces to permit the vapors to escape into chambers 25 and to prevent descending liquid from entering the metering tubes 28. From each chamber 25 the vapors pass up through the corresponding tube 11 wherein the desired rectification takes place.

When tubes 11 are packed, and more particularly when the packing is continuous, the phases will contact each other essentially in film form. Depending upon the rate of reflux flow, the reflux, which is conducted down through each tube over the packing medium, will be maintained either entirely in film form or with a portion alternately in film and drop form. The latter also affords efficient fractionation because of a sort of kneading action caused by the drops recontacting the packing and respreading out into films only to be followed by the formation of more drops. This brings a large proportion of the liquid to the surface for contact with ascending vapors.

Rectified vapors escaping from the upper ends of tubes 11 are combined and thoroughly mixed as they pass through opening 22a in plate 21a. A part of these combined and mixed vapors may be drawn off through vapor draw-off tube 33 and condensed to form the product.

The remaining vapors are metered into chambers 25a by metering tubes 28a which, under the assumed conditions, are also of equal capacity, but are also capable of adjustment, for instance, by being interchangeable to compensate for inequalities in the fractionating units.

From chambers 25a the vapors flow into tubes 35 wherein they are totally condensed. These vapors, if metering tubes 28a are of equal capacity, will enter tubes 35 in equal amounts and, as a result, equal amounts of condensate will be formed in each tube 35. Otherwise, the quantity of condensate formed will vary between tubes 35 according to compensating adjustments made in metering tubes 28a.

The condensate from each tube 35 will flow downwardly into its associated chamber 25a and then through a separate drain tube 29a down into the individual tube 11 to which the particular tube 35 is intended to furnish reflux.

Reflux condensate is thus supplied to the individual fractionating units.

The liquid that descends from each tube 11 at the bottom collects in the corresponding chamber 25 from which it drains down into chamber 18 through the corresponding tube 29.

The purpose of cups 30 and 30a is to form a liquid seal to prevent vapors from ascending through tubes 29 and 29a. Since there will be a pressure drop between chamber 18 and chambers 25 and between the upper ends of tubes 11 and chambers 25a, liquid will rise in tubes 29 and 29a and will stand at a certain height therein depending, of course, upon the pressure drop. Cups 30 and 30a are preferably of sufficient capacity to furnish the required amount of liquid for tubes 29 and 29a at the time of starting, thus making it unnecessary to depend upon descending reflux for this purpose. Thus, the tower will reach equilibrium conditions in a shorter length of time.

By making the pressure drop through metering tubes 28 many times greater than the average pressure drop through the tubes 11, the effect of difference in pressure drop between individual tubes 11 (per unit volume per unit of time) upon the volume of vapor flow through individual tubes is greatly minimized, aside from that resulting from the metering feature taken by itself. For instance, if in operation the average pressure drop through tubes 11 were 2 millimeters and the pressure drop through metering tubes 28 were 20 millimeters, it can be seen that very large differences in pressure drop between individual tubes 11 will affect but little the total pressure drop measured from the lower end of any metering tube 28 and the upper end of the corresponding tube 11.

Thus it will be seen that the individual contacting units need not be as equaly matched to obtain substantially the same rate of vapor flow through each as would be the case if section A were not provided.

It is, of course, to be understood that any differences in fractionating characteristics in the individual fractionating units may be compensated for by adjusting the rate of vapor flow and/or the rate of reflux flow to each unit, for instance by the means already described. However, by making the pressure drop through tubes 28 relatively large, for instance, at least five times the pressure drop through the corresponding fractionating unit or more, satisfactory results for many purposes can be obtained without resorting to compensating adjustments of vapor flow and/or reflux flow.

It will, of course, be understood that if a relatively large pressure drop through metering tubes 28 is resorted to for balancing purposes, metering tubes 28a need not create as large a pressure drop as metering tubes 28. The pressure drop through tubes 28a need be in any case merely sufficient to insure the desired distribution of vapors between the chambers 25a for condensation in tubes 35. The same would be true of metering tubes 28 if a relatively large pressure drop were not employed for balancing purposes.

The particular description herein is for the purposes of illustration and many variations are possible.

For instance, should it be desired to adapt the tower for continuous fractionation with one or more side streams, it would be merely necessary to insert one or more units E (comprising a section B and a section C arranged as shown) between the upper end of section C and the lower end of section D, depending upon the number of side streams desired. Each unit E would furnish one side stream.

In such cases, however, tubes 28a of each section C, except the very uppermost, would function as tubes 28 and what has been said with respect to tubes 28 would apply equally thereto.

Many other variations will suggest themselves to persons skilled in the art.

For instance, plates 21 and 21a might be substituted by a plurality of spaced plates, the uppermost having an opening similar to openings 22 and 22a and the others having a plurality of openings uniformly but differently distributed in each plate to cause the vapors to pass through a circuitous course and to be distributed, redistributed and recombined and thus thoroughly mixed.

While in the particular description the product is withdrawn as a vapor, it is to be understood that any other means known in the art may be employed for the separation of product. For instance, tube 33 may be substituted by a condenser of any type for condensing, collecting, and withdrawing the heavier ends of the ascending vapors as liquid.

If section D were operated as a partial condenser, product could be removed at 49.

Although the feed into the tower has been shown at the bottom thereof, the feed may be at any other point or points and may be in the vapor or liquid phase according to the type of operation and the manner of feed. The feed material is, of course, preferably metered into the fractionating units following the principles of feed discussed above. For instance, in a tower with matched fractionating units the feed would be preferably at the same rate or substantially so into each fractionating unit.

If the tower is to be operated as a stripping tower, then the feed may be introduced into section C through tube 33 as vapor, and the condensing section D may serve to completely or partially condense these vapors.

If the vapors are partially condensed then the remainder would pass out through 48 and 49 to another condenser affording complete condensation to liquid. Any desired quantity of the latter liquid might be recycled and intimately mixed with the boiling charge which is supplying the vapors to pipe 33.

The reflux supplied by section D would descend in the usual way to the base of the tower while contacting countercurrently ascending vapors. The latter vapors would be generated at the base of the tower by the vaporization of a part of the liquid reflux leaving the base of the tower. The remainder of the liquid reflux would be withdrawn as product in the usual way.

Any other mode of operation may be adopted, changes in construction being made when necessary, without departing from the spirit of the invention.

It will be noted that the desideratum is that the vapors leaving any individual fractionating unit shall be of the same composition as the vapors leaving any other individual fractionating unit.

In substantially accomplishing the foregoing it is simpler to make tubes 11 of the same cross section and length, to provide the same type of contacting means in each tube, to feed vapors to be fractionated at substantially the same rate to each tube, and to feed reflux condensate at substantially the same rate to each tube.

However, the individual fractionating units may differ without departing from the spirit of the invention. For instance, differences may be in construction, such as size, length, contacting means or otherwise.

As an illustration, the individual fractionating units may vary as to construction but may be matched so that each will deliver rectified vapors of substantially the same composition when vapors are fed at substantially the same rate to each, and reflux condensate is fed at substantially the same rate to each.

On the other hand, the individual fractionating units may be of the same and/or of a different construction but may differ as to capacity. In this case adjustments of the vapor feed and/or of the reflux condensate feed may be made to cause the rectified vapors from any unit to be substantially the same as the rectified vapors from any other unit.

The use of metering tubes 28 makes it possible to adjust the feeding rate of vapors to any fractionating unit by employing a metering tube for that unit of the desired capacity. Likewise, the use of metering tubes 28a makes it possible to adjust the rate of feed of reflux condensate to any fractionating unit by employing a metering tube for that unit of the desired capacity. If necessary, the condenser for any fractionating unit may be especially constructed to meet requirements.

Thus, the desired balance may be obtained. The precision of this balance will, of course, depend upon the results desired and, therefore, may be rough or close according to requirements.

Other variations are possible. For instance, if tubes 11 are of the same cross section and are equally matched as to pressure drop, section A may be omitted entirely. The ascending vapors, due to the uniformity of pressure drop, will be divided equally between the various tubes 11. Sections C and D will function to feed the same amount of reflux condensate into each tube 11.

It will be noted that in the operation of tower 10 as described and in the operation of the various modifications thereof so far referred to, a commingling of the rectified vapors produced by the various individual fractionating units takes place from which the reflux condensate is formed, and the product comprises a part of such commingled vapors taken off either in vapor or liquid form.

The construction of tower 10 may be modified so that a commingling of the rectified vapors does not take place at least not prior to the formation of reflux. In this case, the reflux condensate and product for any fractionating unit is formed from the rectified vapors of that unit, and the separate portions of product withdrawn from each fractionating unit are combined either in vapor or liquid form after segregation from their respective individual fractionating units.

Due to the balancing of the various fractionating units and the manner of withdrawal of product, the product from any one fractionating unit is of substantially the same composition as the product from any other fractionating unit.

Suitable modifications of tower 10 to accomplish this purpose are illustrated in Figures 7, 8, 9 and 10.

Figure 7:
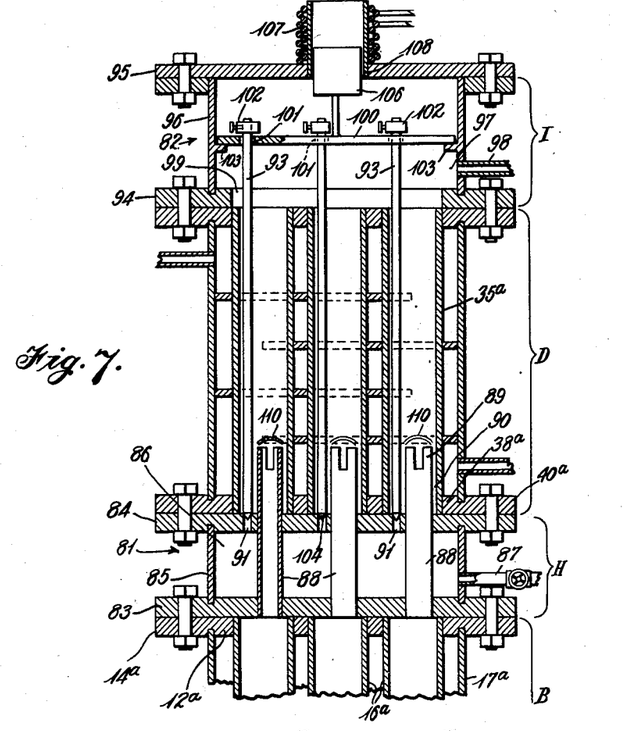
Figures 7, 8, 9, 10, 11 and 12 are sectional elevations (shown broken) each illustrating a different form of the invention.

Referring now more particularly to Figure 7, at 81 is shown a section H interposed between a section B and a section D in place of section C of Figure 1a, and at 82 is shown a section I which is superimposed upon section D in place of chamber 48.

Section H comprises spaced plates 83 and 84 joined by a shell 85 to form a product collecting chamber 86, having a drain 87.

Plate 83 contacts tube sheet 12a of section B and is illustrated as being secured to flange 14a integral with the tube sheet.

Plate 84 contacts tube sheet 38a of section D and is illustrated as being secured to flange 40a integral with the tube sheet.

A tube 88 connects each fractionating unit 16a with its corresponding condenser 35a, each tube 88 extending through plates 83 and 84 and having a weir-like upper end 89 which projects up into the corresponding condenser 35a, sufficiently to form a well 90.

Each well 90 is provided with a drain comprising an aperture 91 in plate 84.

Each aperture 91 cooperates with a member 93 of section I. Each member 93 extends down through the corresponding condenser 35a.

Section I comprises spaced plates 94 and 95 connected by a shell 96 to form a chamber 97 having an opening 98 for the escape of non-condensable gases. Plate 94 has a large opening 99 at its center to permit free access of the upper ends of condensers 35a with chamber 97.

A plate 100 extends transversely of chamber 97. Members 93 pass through and have a sliding fit in apertures 101 in plate 100 and are provided with collars 102 at their upper ends. The arrangement is such that when plate 100 rests on stops 103 collars 102 are free of plate 100 to make ends 104 of members 93 free to close apertures 91.

Armature 106 of solenoid 107 is attached to plate 100 and is slidable in aperture 108 in plate 95. The arrangement is such that when solenoid 107 is energized, armature 106 moves upwardly raising members 93 sufficiently to bring ends 104 clear of apertures 91 to permit wells 90 to drain into chamber 86.

The operation of the form shown in Figure 7 is as follows:

When section D operates as a total condenser, all of the rectified vapors produced by any one fractionating unit 16a flow up into its corresponding condenser 35a wherein they are totally condensed. Apertures 91 being closed, all of the condensate formed in each condenser 35a will collect in the corresponding well 90 and after filling the well will overflow the weir-like end 89 of the associated tube 88 and be conducted back to the same fractionating unit 16a which has produced the vapors from which the condensate is formed.

The tower is now operating under total reflux. The condensate formed in each condenser 35a, after flowing down into its well 90, will wash up over the weir 89. As a result the condensate in well 90 is continuously replaced and thus follows in composition the vapors entering the associated condenser 35a.

Eventually the composition of the condensate in wells 90 will become more or less constant, or will have the desired composition, whereupon solenoid 107 is momentarily energized to permit the condensate in wells 90 to drain down into chamber 86. Upon the re-closure of apertures 91 the cycle repeats itself.

The product is removed from chamber 86 through outlet 87.

Solenoid 107 may be operated automatically or manually and the interval of time between successive drainings of wells 90 will depend upon the narrowness of the cut desired.

To obtain the narrowest cut this interval will be sufficiently long to permit the condensate in wells 90 to become substantially constant in composition.

Wells 90 may be made of any desired capacity by raising and lowering the weir-like end 89 and/or by varying the cross sectional area of the corresponding condenser 35a.

The size of wells 90 will be a matter of design. When the charge into the still is to be large, wells 90 may obviously be larger.

Since equilibrium conditions in the tower will be upset to a lesser extent when small amounts of condensate are withdrawn and thus will be reestablished more quickly after each withdrawal, wells 90 may be relatively small and the drainings may take place at shorter intervals of time.

To prevent condensate from falling directly into the upper ends of tubes 88 caps 110 may be provided.

Any other arrangement to perform the functions of sections H and I may be adopted to carry out the principles just described.

Figure 8:
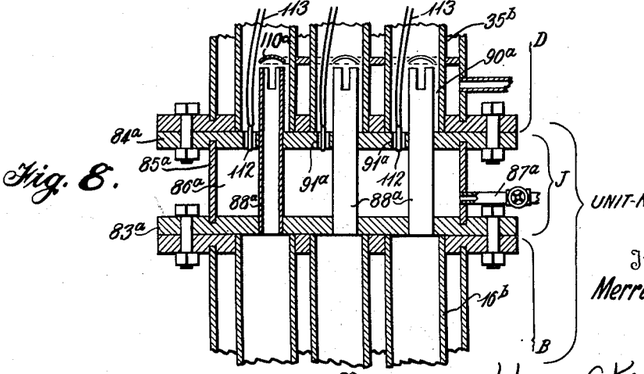

For instance, another arrangement is illustrated in Figure 8 wherein sections B and D have been reproduced and section J is illustrated as being of the same construction as section H. Section I is not employed.

In place of section I a small electrical heating element 112 is arranged in each aperture 91a in a manner to leave a space between element 112 and the walls of aperture 91a for the drainage of the corresponding well 90a. The wires 113 for energizing each element 112 may be carried out of the tower by any suitable means, for instance, wires 113 may extend up through condensers 35b.

The operation of the form shown in Figure 8 is as follows:

Heating elements 112 are energized and any condensate tending to drain down into chamber 86a is immediately vaporized. Since the condensate is near its boiling point, only a small amount of energy will be required for this purpose. The vapor produced will tend to rise and will thus prevent drainage of condensate.

When it is desired to drain the condensate from wells 90a, heating elements 112 are deenergized for a sufficient length of time to permit such drainage.

Figure 9:
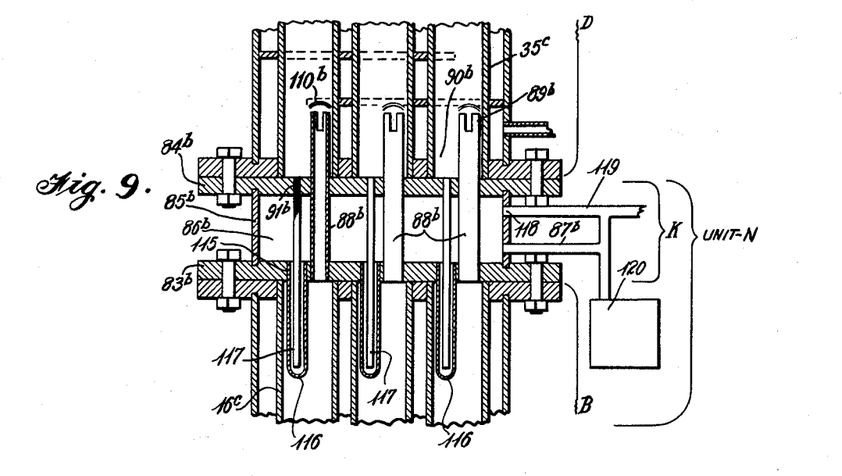
Figure 10:
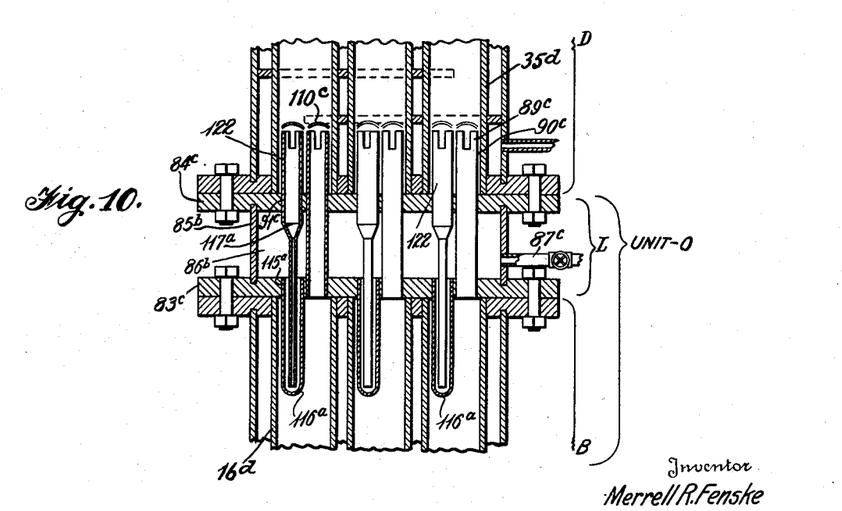

Arrangements wherein drainage from the condenser wells may take place continuously rather than intermittently are illustrated in Figures 9 and 10.

Referring now more particularly to Figure 9, sections B and D have been reproduced and section K has been interposed therebetween in place of either section H or section J.

Section K is similar in construction to sections H and J except that plate 83b is provided with a plurality of apertures 115 in each of which is arranged a downwardly extending well 116 one for each fractionating unit 16c and each aperture 91b is provided with a tube 117 which extends down into the corresponding well 116. Shell 85b is also provided with an opening 118 into chamber 86b. A manifold 119 communicating with opening 118 is combined with drain 87b in a manner so that both communicate with a receiver 120 for the product.

The operation of the form of the invention shown in Figure 9 is as follows:

A constant air (or other non-condensable gas) pressure is maintained in manifold 119 and consequently in chamber 86b and receiver 120. This pressure is adjusted so as to cause the condensate formed in each condenser 35c to back up in the corresponding well 90b and about the weir-like end 89b of the corresponding tube 88b.

The reflux ratio will be determined by the height to which condensate is caused to stand in the wells 90b and this in turn is determined by the air pressure.

For intermittent withdrawal of product, the air pressure would be sufficiently great to prevent any condensate from rising in wells 116 sufficiently to overflow into chamber 86b. Then, to drain the wells 90b the air pressure would be momentarily released.

For continuous withdrawal of product the air pressure would be such that condensate would overflow the upper ends of wells 116, the extent of this overflow and consequently the reflux ratio being determined by the air pressure employed.

Product collecting into chamber 86b drains into receiver 120.

Another construction adapted to continuous removal of product is illustrated in Figure 10 wherein sections B and D have also been reproduced and wherein section L is substituted for sections H, J, or K.

Section L is somewhat similar in construction to section K except that opening 118 and manifold 119 have been omitted and tubes 117a have been illustrated as having upper ends 122 of somewhat larger diameter than tubes 117 with said upper ends 122 extending up into wells 90c to form weirs similar to weirs 89c.

The operation of the form of the invention shown in Figure 10 is as follows:

Weirs 89c and 122 are adjusted as to the capacity to provide the desired reflux ratio. Condensate draining into tube 117a over weir 122 collects in well 116a and overflows into chamber 86b from which it is drained through outlet 87c.

The forms of the invention illustrated in Figures 7, 8, 9 and 10 have the effect of adjusting the relative amount of reflux in the various fractionating units in accordance with the relative volumes of rectified vapors produced and thus have a tendency to even out differences in the composition of the product produced by the various fractionating units insofar as vapor volume is an inverse function of vapor rectification. This is because any fractionating unit tending to produce a relatively larger volume of rectified vapors will automatically operate with a larger amount of reflux because of the larger volumes of condensates formed.

While the forms of the invention shown in

Figures 7, 8, 9 and 10 have been described as producing a single product, these forms of the invention may also be employed to produce a plurality of products, that is, these forms of the invention may be employed to produce side streams.

For convenience in description, sections B and J of Figure 8 will be referred to as comprising a unit M; sections B and K of Figure 9 as comprising a unit N; and sections B and L of Figure 10 as comprising a unit O.

Now to provide any desired number of side streams any desired number of sections M, N, and/or O might be superimposed. Each such section would provide one side stream and finally section D would be superimposed upon the uppermost section M, N, or O as the case might be. It should be noted that a section B might be secured to sections J, K, or L in the same manner as section D and that tubes 16b, 16c and 16d will function the same as tubes 35b, 35c, and 35d for the formation of the wells and operation of the weirs and other parts associated therewith.

With such an arrangement descending reflux takes the place of the condensate formed in section D in forming product for the side streams.

If plates 95 and 100 of unit I were removed and members 93 raised and lowered in any other suitable manner, the construction shown in Figure 7 might also be adapted for use in providing side streams the same as sections M, N and O.

Thus any desired number of side streams might be obtained.

It is, of course, to be understood that in the various modifications of Figures 7, 8, 9 and 10, section D might in addition be operated as a partial condenser and the uncondensed rectified vapors taken off as product.

When the individual tubular contacting units of the various Figures 7, 8, 9 and 10 are matched as to cross sectional area and pressure drop the individual condensers 35a might also be matched so as to have at least a substantially identical effect upon pressure drop. This might be desired particularly in cases in which a section A is not employed for feeding the vapors into the bottom of section B.

Figure 11:
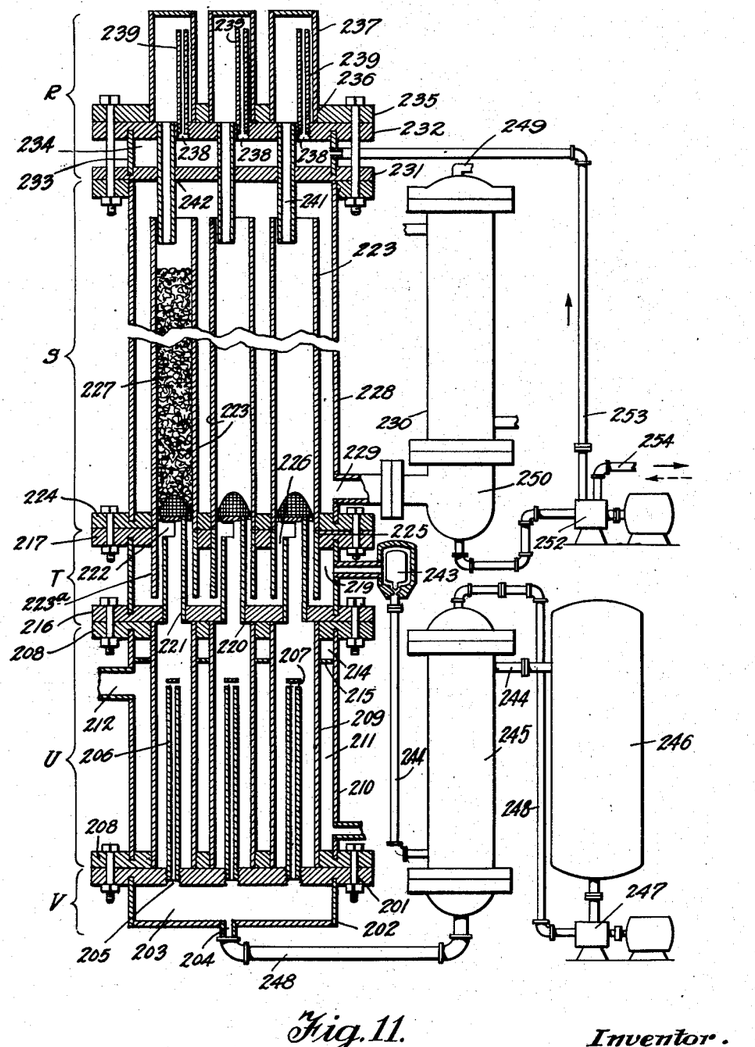

Another form of the invention is illustrated in Figure 11.

In the form of the invention illustrated from Figures 1 to 6 inclusive both the feed and the reflux are metered in the vapor phase for proportioning purposes.

Either the feed or the reflux or both might be metered in the liquid phase for the same purpose.

A form of the invention in which both the feed and the reflux are metered in the liquid phase is illustrated in Figure 11.

Another feature of this form of the invention is the maintenance of substantially adiabatic conditions in and about the individual fractionating units.

For convenience in description the apparatus in Figure 11 will be referred to as comprising superimposed sections R, S, T, U and V.

Section V is a liquid feed proportioning section and comprises a plate 201 with which is associated an inverted cap 202 to form a feeding chamber 203.

Chamber 203 has an inlet 204 and a plurality of outlets 205.

An upwardly extending proportioning tube 206 is secured in each outlet 205 and is provided with a cap 207.

Section U which is superimposed upon section V is a heating or still section and comprises spaced tube sheets 208 between which are arranged a plurality of tubes 209 and a shell 210 surrounding said tubes and forming a heating chamber 211 therewith.

Tubes 209 are of the same number as proportioning tubes 206 and the arrangement is such that the proportioning tubes 206 extend up into tubes 209 and are more or less concentric therewith.

Heating chamber 211 is illustrated as having an inlet 212 and an outlet 213. The dead air space 214 formed by plate 215 is for heat insulation purposes.

Section T which is superimposed upon section U comprises spaced plates 216 and 217 between which is arranged a shell 218 to form a chamber 219.

Plate 216 has a plurality of apertures 220 each arranged immediately above a separate tube 209 of section U.

Each aperture 220 supports the lower open end of a tube 221.

The upper end of each tube 221 is closed. Each tube 221, however, is provided with an opening 222 in its side wall immediately below the closed end.

Section S which is superimposed upon section T is a fractionating section and comprises a plurality of packed tubes 223 supported in tube sheet 224. Tubes 223a which are secured in apertures 225 in plate 217 are in alignment with tubes 223 and extend downwardly into chamber 219.

The arrangement is such that each aligned pair of tubes 223 and 223a surrounds a separate tube 221 in a more or less concentric manner leaving an annular space 226 therebetween.

Tubes 223a stop short of plate 216 for purposes which will hereinafter appear.

Tubes 223 are preferably provided with a suitable contacting medium 227 such as packing, etc.

Tubes 223 are surrounded by a shell 228 which extends upwardly beyond the upper edges of tubes 223.

Shell 228 is provided with an outlet 229 which leads to condenser 230.

Superimposed upon section S is section R.

Section R is a reflux proportioning section. Spaced plates 231 and 232 have interposed therebetween a shell 233 to form a reflux feeding chamber 234. A plate 235 is positioned upon plate 232 and has a plurality of apertures 236 in each of which is secured the open end of a tube 237. Each tube 237 has its top end closed.

Plate 232 is provided with a plurality of apertures 238 each of which supports the lower end of a proportioning tube 239. The arrangement is such that each proportioning tube 239 extends upwardly into a separate tube 237.

Plate 232 is also provided with a plurality of apertures 240 of the same number as the tubes 237 and 239 as well as of the same number as tubes 223.

Depending from each aperture 240 is a reflux drain tube 241 which extends downwardly through a separate aperture 242 in plate 231 and into a separate tube 223.

Shell 218 of section T has an outlet spaced above the lower ends of tubes 223a which leads to trap 243.

Trap 243 has an outlet connected to line 244 which leads through heat exchanger 245 to receiver 246.

Receiver 246 has an outlet connected to pump 247 from which line 248 leads through heat exchanger 245 to inlet 204 of section V.

Condenser 230 has a vent 249 at its top for the escape of noncondensible gases.

The condensate formed in condenser 230 flows down into well 250 and then through line 251 into proportioning pump 252.

Pump 252 has two outlets. One outlet is connected by line 253 to chamber 234. The other outlet is connected to line 254 through which product is withdrawn.

The operation of the form of the invention shown in Figure 11 is as follows.

If batch enriching is desired the liquid to be fractionated flows from receiver 246 through metering pump 247 and line 248 to chamber 203 of section V, passing through heat exchanger 245 on its way.

Liquid in chamber 203 is substantially equally proportioned into tubes 209 by means of proportioning tubes 206. The arrangement of caps 207 is preferably such that the liquid is thrown outwardly against the inner walls of tubes 209 to facilitate vaporization by means of a suitable heating fluid contained in heating chamber 211 which surrounds tubes 209.

The dead air space 214 reduces heat flow from section U to section T. Any other heat insulating medium might be substituted.

Since the feed liquid is substantially equally proportioned among the tubes 209 the vapors generated in the tubes 209 will be substantially equal in amounts.

These vapors pass up through tubes 221, out through openings 222 and up through tubes 223; then down around tubes 223 and out through outlet 229 to condenser 230 where they are totally condensed.

By causing the vapors to flow down around tube 223 substantially adiabatic conditions are maintained in tubes 223 wherein the fractionation takes place.

The condensate formed in condenser 230 collects in well 250 and flows through line 251 to proportioning pump 252 which maintains the desired proportion between reflux liquid and liquid product.

Liquid product is withdrawn through line 254. Liquid reflux flows from proportioning pump 252 through line 253 to chamber 234 and it is substantially equally divided by flowing up through proportioning tubes 239 contained within the tubes 237. The reflux liquid is then conducted downward through tubes 241 into the tops of tubes 223 which comprise the fractionating units.

If desired tubes 241 may be provided at the lower end with cups so as to form a liquid seal to prevent vapors from ascending these tubes. The cups enable liquid to flow out of tubes 241 into tubes 223, but prevent the inflow of vapors.

The liquid reflux flows downwardly through tubes 223 and is intimately contacted therein by the ascending vapors.

The reflux liquid leaving the bottoms of tubes 223a collects in chamber 219 of section T, overflows into trap 243 and is then conducted by line 244 through heat exchanger 245 to receiver 246.

The reflux liquid while passing through heat exchanger 245 gives up heat to the feed liquid flowing through line 248.

The function of trap 243 is to prevent the escape of vapor through line 244.

Should it be desired to convert the form of the invention shown in Figure 11 for batch stripping rather than batch enrichment purposes it is merely necessary to eliminate section T together with trap 243 and connect section S directly to section U. The connection between heat exchanger 245 and receiver 246 through line 244 would be broken and any suitable cooling medium would be flowed through line 244 for condensation purposes.

The operation would then be as follows:

The feed is now through line 254 into pump 252 wherein the feed liquid is mixed with liquid passing to the pump through line 251. The mixed liquid flows through line 253 into chamber 234 and is thus fed in equal amounts into the tops of tubes 223.

Liquid leaving the bottoms of tubes 223 passes directly down into vaporizing tubes 209 where it is completely vaporized by the heating medium passing through heating chamber 211.

Product vapors escape into tubes 206 underneath caps 207 and into chamber 203 of section V. These vapors are led through line 248 into condenser 245, line 248 being preferably connected to the top of condenser 248 so that the condensate may be withdrawn from the bottom as product.

The vapors escaping from the tops of tubes 223 flow down around and about the tubes 223 and pass into condenser 230 through outlet 229 wherein they are totally condensed, the condensate collecting in well 250 from which it is recycled through pump 252.

The form of the invention shown in Figure 11 offers relatively simple construction together with ready accessibility of parts.

Tubes 223 may be of light weight and of relatively inexpensive construction, since there are no complicated fabrication problems or pressures to withstand.

By passing the vapors down around the outside of tubes 223 problems in construction and of heat insulation to obtain substantially adiabatic conditions are greatly simplified.

In fractionating close boiling liquids, that is, those boiling 10° C. (18° F.) or less apart not only is a relatively large number of perfect plates or their equivalent needed but the minimum reflux ratio required for the separation is also quite large. This means that to obtain one volume of liquid product a considerable number of volumes must be boiled.

In general there are two methods by which the heat requirement for close fractionation may be reduced. Both methods employ essentially the principles used in multiple effect evaporators. Two or more fractionating columns are employed and they are connected in series in one case and in parallel in the other.

In what may be termed the parallel method of operating multiple distillation columns, the vapors from one column furnish by their condensation the necessary reboil heat in the next succeeding column. In this way the feed flows in parallel through the columns and each produces a separate product.

Figure 12:
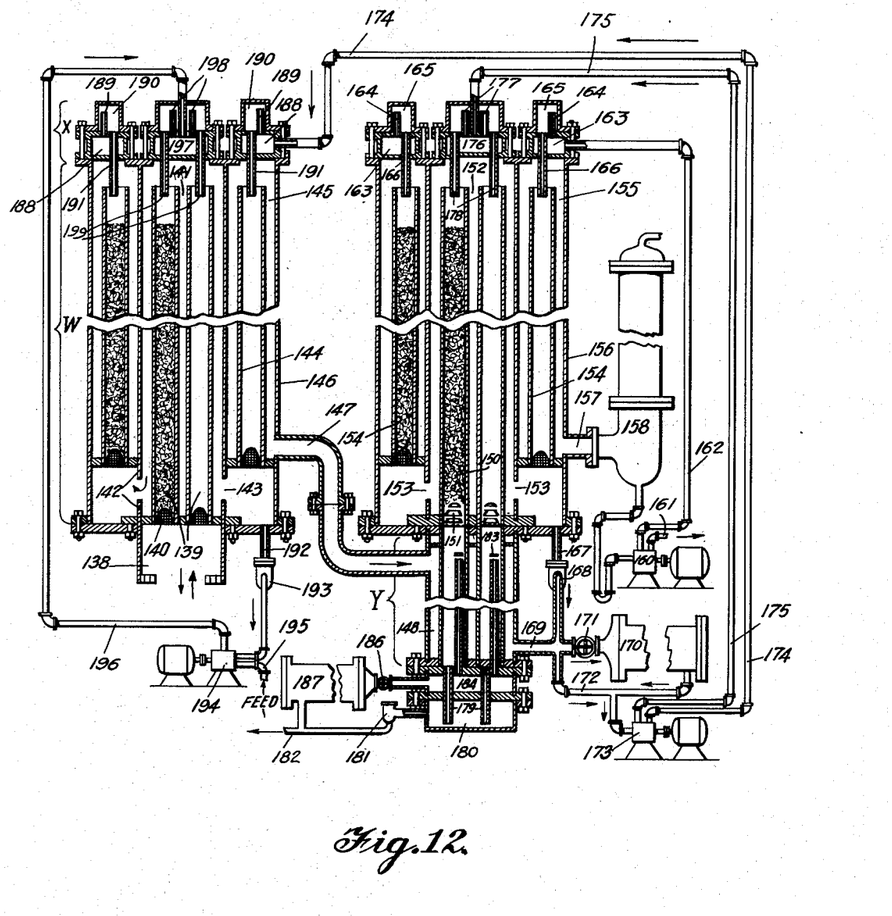

Apparatus adapted for continuous fractionation and employing the multiple effect method on the series principle is illustrated in Figure 12.

Two units are disclosed each having an inner stripping section enclosed in a shell about which is arranged an enriching section which is also enclosed in a shell concentric with said first-mentioned shell.

This arrangement is adopted instead of placing the enriching section on top of the stripping section as is customary.

Referring now more particularly to the unit on the left of Figure 12, the stripping section is contained within shell 142 and the enriching section is contained in the annular space formed between shells 142 and 146.

Any desired number of packed tubes 139 may be used in the stripping section and any desired number of packed tubes 144 may be used in the enriching section.

Substantially equal quantities of vapors flow up through tubes 139 because these tubes are identical and are packed identically, thereby offering equal resistance to vapor flow. Or vapors may be proportioned to these tubes by the other means already described. The same applies to tubes 144.

The unit on the right is of a similar construction and further details of both units and their accessories will be brought out during the following description of operation.

Vapors from a still or other convenient source pass up through space 138 and through packed fractionating tubes 139. Vapors escaping at the tops of tubes 139 flow downwardly about tubes 139 through space 141 within shell 142 and escape at the bottom of shell 142 into the bottom of the enriching section through openings 143.

These vapors then pass upward through packed fractionating tubes 144 of the enriching section and escape at the tops of tubes 144 to be lead downward about tubes 144 through annular space 145 within shell 146.

The vapors are conducted from space 145 through line 147 into the evaporating or boiling section Y at the base of the unit on the right.

The pressure prevailing in the unit on the left is such that the vapors in heating chamber 148 of section Y by condensing on the outside of tubes 149 are capable of boiling liquid flowing down on the inside of tubes 149 the purpose of which will hereinafter appear.

Uncondensed vapors and liquid condensate flow from heating chamber 148 through line 169, the liquid condensate flowing through line 172 to proportioning pump 173 and the uncondensed vapors flowing through regulating valve 171 into condenser 170 from which liquid condensate also flows to proportioning pump 173.

At proportioning pump 173 the liquid condensate is divided and proportioned so that a desired part is returned as reflux to the enriching section of the unit on the left of Figure 12 while the remainder becomes the liquid feed for the unit on the right.

Liquid reflux for the unit on the left flows from proportioning pump 173 through line 174 into space 188 at the top of the left unit where it is proportioned between the tubes 144 of the enriching section by flowing up through metering tubes 189 into spaces 190 and then down through tubes 191 and into the tops of tubes 144 in a manner much the same as already described in connection with Figure 11.

Reflux liquid escaping from the lower ends of tubes 144 of the enriching section is conducted through line 192 and trap 193 into proportioning pump 194 which maintains a desired ratio between this reflux liquid and fresh feed liquid for feeding through line 196 into the stripping section.

Feed liquid for the stripping section flows into space 197 of section X and is proportioned between tubes 139 of the stripping section by flowing upward through proportioning tubes 198 and then down through tubes 199 into the tops of tubes 139 of the stripping section.

Screens 140 illustrated at the base of tubes 139 and similar screens where illustrated are for the purpose of supporting the packing material. It is to be understood that all fractionating tubes have contacting means therein even though shown blank. However, if the tubes are sufficiently small in diameter packing may not be required.

The liquid leaving the base of tubes 139 of the stripping section flows down through space 138 into the still or other vaporizing means where a part is vaporized to furnish vapors to the stripping section and a part is withdrawn as bottom product or stripped liquid.

Incidentally a section Y such as illustrated at the base of the right unit might be used for this purpose upon supplying a suitable heat exchange fluid such as steam or other vapor or liquid to the heating chamber 148. In this case section Y would be connected to the left unit in the same manner as illustrated for the right unit.

The operation of the unit on the left has now been completely described.

Returning now to proportioning pump 173, the remainder of the liquid flowing to this pump passes through line 175 into space 176 at the top of the right unit where it is proportioned into packed fractionating tubes 150 of the stripping section contained within space 152 by flowing up through proportioning tubes 177 and then down through tubes 178 into the tops of tubes 150.

Liquid leaving the base of tubes 150 is conducted outwardly against the inside walls of tubes 149 of section Y by means of baffles 151 and flows downwardly on the inside walls of tubes 149 until vaporized by the heat of condensation of vapors from the left unit in chamber 148 as has been described.

If the liquid flowing down on the inside of tubes 149 is completely vaporized, then a part of these stripped vapors is withdrawn from section Y through proportioning tubes 183. It will be noted that proportioning tubes 183 are similar in construction to proportioning tubes 206 of Figure 11 and that section Y is very similar to section U of Figure 11.

Vapors withdrawn through proportioning tubes 183 flow downwardly therethrough into space 184 and into condenser 187, the quantity being regulated by valve 186. Condensate from condenser 187 is withdrawn as product through line 182.

If the liquid flowing down on the inside of tubes 149 is not completely vaporized then the residual liquid flows downwardly through tubes 179 into space 180 from which it is withdrawn through trap 181 into line 182 and passes out as product with the liquid condensate from condenser 187.

It should be noted that residual liquid only might be withdrawn as product by closing the valve 186.

The rest of the vapors generated inside tubes 149 pass upward through packed fractionating tubes 150 of the stripping section escaping at the top into space 152 wherein they flow downwardly around tubes 150 and escape from the stripping section into the enriching section through openings 153 in the shell surrounding the stripping section. The vapors then pass upward through packed fractionating tubes 154 of the enriching section. The vapors escaping at the tops of these tubes pass downwardly in the annular space 155 about tubes 154 and flow to condenser 158 through opening 157 at the bottom of outer shell 156.

The vapors are completely condensed in condenser 158 and the liquid condensate flows through line 159 to proportioning pump 160.

Proportioning pump 160 serves to maintain a desired proportion between product which is withdrawn through line 161 and liquid reflux for the enriching section which flows through line 162 into chamber 163 at the top of the right unit. This liquid reflux is proportioned between fractionating tubes 154 of the enriching section by flowing upwardly through proportioning tubes 164 into spaces 165 and then down through tubes 166 into the tops of fractionating tubes 154.

Liquid reflux leaving the base of fractionating tubes 154 is withdrawn through line 167 and trap 168 through line 172 to proportioning pump 173 where it is combined with liquid condensate from line 169 and liquid condensate from condenser 170.

It will be recalled from the description of the left unit that the reflux liquid leaving the base of the enriching section of this unit flows through line 192 and trap 193 into proportioning pump 194 from which it is fed into the top of the stripping section. This liquid reflux is obviously in substantial equilibrium with the vapors produced by fractionating tubes 139 of the stripping section since it was last in contact therewith. This being true, the effect is substantially the same as if fractionating tubes 144 of the enriching section were joined to the tops of fractionating tubes 139 of the stripping section. If this were the case it will be seen that this liquid reflux would flow directly from fractionating tubes 144 into fractionating tubes 139. If this were done pump 194 would then serve for feeding fresh feed only which would enter the system at the conventional point, namely at the junction of tubes 144 and tubes 139.

Therefore, one effect produced by the construction of this unit is to cut the tower one half in actual height without sacrifice in efficiency, that is, in the number of theoretical plates.

Such an arrangement also makes it possible to use highly simplified constructions and affords ready accessibility for cleaning. This applies particularly to the proportioning devices at the top of the unit which would otherwise be almost inaccessible.

What has been said with respect to the left unit applies equally to the right unit since the liquid reflux escaping from the enriching section through line 167 and trap 168 is in part fed to the top of the stripping section of the right unit.

As far as the right unit is concerned the condensate from line 169 and condenser 170 may be regarded as fresh feed, but as far as the left unit is concerned it is reflux liquid for the enrichment section since it has been formed from vapors produced by the enrichment section of the left unit.

From the description of Figure 12 the modifications required for employing the multiple effect on the parallel principle will immediately suggest itself to persons skilled in the art, upon becoming familiar with this invention.

It is to be understood that any of the towers described herein may be operated at either subatmospheric, atmospheric, or superatmospheric pressures without departing from the invention.

While the packing in the tubes of the various contacting sections has been illustrated as being uniformly distributed, it is to be understood that this packing may vary as to free space, for instance alternately or otherwise. In this case the denser portions would tend to act as distributors. Furthermore, as pointed out previously the contacting sections may be left unpacked without departing from the scope of the invention, or any other contacting medium may be employed.

When a shell is employed to enclose the tubes of section B the various tubes are in heat exchange relationship with each other making it possible to approach heat equilibrium between the tubes, for instance by the introduction of vapors from the still or any other source into the shell.

Although the walls of the contacting tubes of section B as well as the contacting tubes of Figures 11 and 12 have been shown as imperforate, these tubes might have perforated walls or might be made of a reticular substance such as wire cloth. In this case, baffles might be placed between the tubes to cause the vapors to flow inwardly through the tube walls to the extent desired. Such baffles might be of any suitable construction and need not be supported on the tube walls or in contact therewith. On the other hand, such baffles might be attached to the tube walls and might take the form of spaced protuberances attached to the tube walls and arranged in any desired manner, for instance as illustrated in my Patent 2,037,316, April 14, 1936.

Perforations in the tubes, regardless of number, would tend to equalize the pressure in the various tubes. Therefore, only a few for instance at regularly spaced intervals might be provided to accomplish this purpose.

Any other contacting means may be employed in the fractionating tubes. For instance, the tubes might be provided with indentations or with any other type irregular inner surface or might merely be of very small inner diameter. Other types of packing or contacting means might be employed.

The fractionating tubes, while illustrated as being straight, may have any other configuration or contour, for instance such as that of a spiral, it being merely necessary to have a vertical component or its equivalent, that is, an arrangement whereby the phases flow countercurrently due to a difference in density.

In the case of spirals, these may be a series of rectangular shaped spirals placed on top of each other, with each spiral open at its lower end to receive vapors and emit liquid reflux, and at its upper end to receive reflux condensate and emit vapors. These spirals are otherwise separate, and function exactly like the fractionating tubes illustrated and/or described herein. By having the height of the rectangular passage in the spiral much less than its width, and the width lying in substantially a horizontal plane, there is provided good vapor-liquid contact since the liquid will flow down the wide flat surface of the spiral so exposing a relatively large area for interaction with the vapors flowing countercurrently to the liquid.

When the fractionating tubes are straight, the packing may be made up into cartridges having perforated ends. Such cartridges might be slipped in and out of the tubes. The cartridges might be made up in standardized units, thus making it possible to readily match the contacting efficiencies of the various tubes.

It is, of course, understood that the various points indicated for the withdrawal of product might be employed for feeding fluid into the tower either in the vapor or liquid phase or that the point or points of feed might be otherwise than indicated.

Many other variations are possible without departing from the spirit of the invention.

It will be seen that a fundamental characteristic of similarity between the several embodiments of the invention described is found in the formation and maintenance of a plurality of separate streams of reflux condensate, these separate streams being maintained in film form or with a part in alternate film and drop form and brought into intimate contact with a counterflow of vapors to be rectified and being largely formed from a portion of said vapors after rectification with provision being made, by means of proportioning or metering devices, to have the same proportion or ratio of vapor to liquid flow in each of the separate paths or streams.

However, this invention may be used to contact any gas phase with a liquid phase, and as such is also suitable and efficient as an absorber, wherein a gas is being treated with a liquid under counter-current conditions.

The term volatility in the claims is used as defined in Walker, Lewis and McAdams, "Principles of Chemical Engineering," 2nd edition, page 585, 1927, McGraw Hill Book Company, and is the partial pressure of a substance in the vapor in equilibrium with a liquid divided by its mol fraction in the liquid.

Having described my invention, it is to be understood that changes, omissions, additions, substitutions and/or modifications may be made within the scope of the claims without departing from the spirit of the invention which is intended to be limited only as required by the prior art.

For instance, when the form of the invention disclosed in Figure 11 is used for stripping purposes as disclosed herein the construction attached to the bottom of section Y of Figure 12 might be substituted for section V of Figure 11.

In such case all of the liquid descending into tubes 209 of Figure 11 from tubes 223 need not be vaporized. In such case the unvaporized portion might be withdrawn through tubes 179 and line 182 as product with or without condensate from condenser 187 depending upon whether valve 186 is open or closed.

Furthermore tubes 223 of Figure 11 might be individually encased with more or less concentric tubes to form individual annular spaces about the tubes 223. Such encasing tubes would be extended upwardly to contact plate 231 but would stop short of plate 224.

In such case the vapors produced by any tube would flow down around that individual tube and would then escape through opening 229 to be condensed as previously described.

However, if desired such encasing tubes might also extend to plate 224 so that the vapors produced by any tube 223 after having contacted the outside of the tube 223 might be conducted away to a separate condenser such as condensers 35, 35a, 35b and 35c and the separately formed condensate fed back into the same fractionating tube 223 which produced the vapors.

Many other modifications are possible.

I claim:

1. In a process for the fractionation of a mixture having components of different volatilities in which a vapor phase is countercurrently contacted with a liquid phase, the steps of forming and maintaining said phases in a plurality of separate streams, contacting each stream of one phase with a separate stream of the other phase in a separate phase contacting path, and metering said vapor phase into each of said paths with a pressure drop relatively large compared to the average pressure drop of said paths.

2. A process for contacting a vapor phase and a liquid phase comprising countercurrently flowing said phases through a plurality of contacting units of relatively small cross sectional area, maintaining the proportion of each phase to the other at least substantially identical in said contacting units by separately metering said vapor phase into each contacting unit and forming the liquid phase for each contacting unit in the top of said contacting unit by condensation from rectified vapor phase produced by said contacting unit, metering product out of each contacting unit, and combining said products.

3. In a process for the fractionation of a mixture having components of different volatilities in which a vapor phase is countercurrently contacted with a liquid phase, the steps of forming and maintaining said phases in a plurality of separate streams, contacting each stream of one phase with a separate stream of the other phase in a separate phase contacting path by separately metering said vapor phase into each path and forming liquid phase reflux in each path from rectified vapors produced in said path, metering a proportionate quantity of said liquid phase out of each of said paths, and combining said proportionate quantities to form the product.

4. In a process for the fractionation of a mixture having components of different volatilities in which a vapor phase is countercurrently contacted with a liquid phase, the steps of forming and maintaining said phases in a plurality of separate streams, contacting each stream of one phase with a separate stream of the other phase in a separate phase contacting path, forming liquid phase reflux in each path from rectified vapors produced in said path, metering a proportionate quantity of said liquid phase out of each of said paths, and combining said proportionate quantities to form the product.

5. Apparatus comprising a plurality of unitary fractionating units, a separate condenser unit combined with each fractionating unit, means for metering vapors to be fractionated in proportionate quantities into said fractionating units, and means for metering liquid phase in proportionate quantities out of said combined fractionating and condenser units at a point adjacent the outlets of said fractionating units and the inlets of said condenser units.

6. Apparatus comprising a plurality of unitary fractionating units, a separate condenser unit combined with each fractionating unit, means for separately metering vapors to be fractionated into each fractionating unit, and means for metering product out of each combined fractionating unit and condenser unit.

7. In a process for the fractionation of a mixture having components of different volatilities in which a vapor phase is countercurrently contacted with a liquid phase, the steps of forming and maintaining said phases in a plurality of separate streams, contacting each stream of one phase with a separate stream of the other phase in a separate phase contacting path, separately generating vapor phase for each phase contacting path from metered portions of feed liquid, combining rectified vapors produced by said phase contacting paths, condensing said vapors, removing a part of said condensate as product, and metering another part of said condensate in separate measured portions into said phase contacting paths to provide the liquid phase of said phase contacting paths.

8. In a process for the fractionation of a mixture having components of different volatilities in which a vapor phase is countercurrently contacted with a liquid phase, the steps of forming and maintaining said phases in a plurality of separate streams, contacting each stream of one phase with a separate stream of the other phase in a separate phase contacting path, separately generating vapor phase for each phase contacting path from metered portions of feed liquid, combining rectified vapors produced by said phase contacting paths, bringing said rectified vapors into heat exchange relationship with the outsides of said phase contacting paths to maintain substantially adiabatic conditions within said phase contacting paths, condensing said vapors, removing a part of said condensate as product, and metering another part of said condensate in separate measured portions into said phase contacting paths to provide the liquid phase of said phase contacting paths.

9. In a process for the fractionation of a mixture having components of different volatilities in which a vapor phase is countercurrently contacted with a liquid phase, the steps of forming and maintaining said phases in a plurality of separate streams, contacting each stream of one phase with a separate stream of the other phase in a separate phase contacting path, combining rectified vapors produced by said phase contacting paths, condensing said vapors, combining feed liquid with said condensate and metering said mixed liquid in measured portions into said phase contacting paths to provide the liquid phase of said phase contacting paths, separately vaporizing the liquid phase leaving each phase contacting path, and returning each separate body of vapors thus generated to a separate phase contacting path to provide the vapor phase of said phase contacting path after removing a portion of said vapors as product.

10. In a process for the fractionation of a mixture having components of different volatilities in which a vapor phase is countercurrently contacted with a liquid phase, the steps of forming and maintaining said phases in a plurality of separate streams, contacting each stream of one phase with a separate stream of the other phase in a separate phase contacting path, metering both phases into each of said paths in at least substantially the same proportion one to the other and bringing the rectified vapors produced by said phase contacting paths into heat exchange relationship with the outsides of said phase contacting paths to maintain substantially adiabatic conditions within said phase contacting paths.

11. In a process for the fractionation of a mixture having components of different volatilities in which a vapor phase is countercurrently contacted with a liquid phase, the steps of forming and maintaining said phases in a plurality of separate streams, contacting each stream of one phase with a separate stream of the other phase in a separate phase contacting path, and separately generating vapor phase for each phase contacting path from metered portions of feed liquid.

12. In a process for the fractionation of a mixture having components of different volatilities in which a vapor phase is countercurrently contacted with a liquid phase, the steps of forming and maintaining said phases in a plurality of separate streams, contacting each stream of one phase with a separate stream of the other phase in a separate phase contacting path, separately generating vapor phase for each phase contacting path from metered portions of feed liquid, and supplying liquid phase in separate metered portions to said phase contacting paths from the components which escape as rectified vapors from said phase contacting paths.

MERRELL R. FENSKE.